United States Patent Office 3,018,195
Patented Jan. 23, 1962

3,018,195
METHOD OF TREATING POLYETHYLENE STRUCTURES
Pennell C. Kelly and Norman L. Hardwicke, Texas City, Tex., assignors to Monsanto Chemical Company, St. Louis, Mo., a corporation of Delaware
No Drawing. Filed May 15, 1958, Ser. No. 735,398
8 Claims. (Cl. 117—138.8)

This invention relates to a method of treating the surface of polyethylene structures and, more particularly, to a process of treating the surface of polyethylene film to render it slip-resistant.

The properties possessed by polyethylene films such as its toughness, semi-transparency, high degree of moisture impermeability and the like make it highly useful for packaging a great variety of materials. Polyethylene bags, for example, are used to package chemicals, fresh produce, textiles, hardware, and the like. Among the materials thus packaged is polyethylene itself in solid pelletized form. The polyethylene bag as used for this purpose has many advantages over the other available commercial bag types such as multi-ply paper bags. It is particularly desirable for use with polyethylene containing carbon black because it obviates the problem of moisture contamination of this product which is a major concern when the ordinary types of containers are employed. However, there is one singular disadvantage in this use of polyethylene bags for packaging polyethylene. A troublesome problem is presented in stacking or storing operations. The loaded bags are very difficult to stack on pallets or other suitable transporting media for conveyance in shipping and storing because of slippage and sliding. The ordinary adhesives or glues cannot be used satisfactorily with polyethylene film surfaces since they do not wet the surface. Hence, the usual techniques used to facilitate stacking with paper bags are not satisfactory. Also, the polyethylene bags are single-ply bags in contradistinction to the multi-ply paper bags commonly employed and thus cannot be subjected to any tearing or ripping-off of layers.

It has now been discovered that this annoying problem can be eliminated by treating the polyethylene bag surfaces with a material which is sufficiently tacky in character to effect a seal between the bags so as to prevent their slipping off one another but which will not "set" to a permanent bond so as to preclude separating them with a reasonable amount of force and without ripping or tearing damage to the bags when it is necessary or desirable to separate them.

It is thus an object of the present invention to provide a method for preventing slippage between polyethylene films. It is a further object of the invention to provide a method of conveniently stacking bags of polyethylene for transportation and storage which will not harmfully affect the bag surfaces in any manner. Other objects and advantages will become apparent from the following description of the invention.

According to the invention, polyethylene film surfaces are rendered slip-resistant by applying to the film surfaces a coating of a viscous, aqueous solution of a hydrolyzed olefin-maleic anhydride copolymer. Particularly preferred are those copolymers which have a specific viscosity in the anhydride form in the range from 0.1 to 1.0, said specific viscosity being determined at 25° C. on a 1% solution (by weight) of the copolymer in dimethylformamide.

The preferred solutions contain about 30% by weight of the copolymer, but solutions containing from about 15% to about 40% by weight of the copolymer can also be used successfully.

The olefin-maleic anhydride copolymers useful in the invention are readily prepared by techniques well known in the art such as, for example, the methods described in U.S. Patent 2,378,629. Generally, the copolymers are prepared by reacting a monoolefin having a terminal methylene group with maleic anhydride in the presence of a peroxide catalyst in an aliphatic or aromatic hydrocarbon which is a solvent for the monomers but is a non-solvent for the copolymer formed. Copolymers suitable for the practice of the invention are those of maleic anhydride with olefins containing from one to eight carbon atoms such as ethylene, propylene, isobutylene, diisobutylene, 1-butene, 1-pentene, 1-hexene, 3-methyl-butene-1 and the like. Hydrolysis of these copolymers is effected simply by heating under reflux conditions the desired proportions by weight of the copolymer and water until solution of the copolymer is effected.

The hydrolyzed copolymer treating agent may be applied in any convenient manner. It may be applied by brushing on over the entire area of contact or only over a restricted area such as an area in the center of the bag about one foot square or a small patch on each of the four corners. Treatment may also be effected by dipping or by conveying the bags across a series of rollers immersed in the tacky solution before stacking them. In addition to its sealant properties, the hydrolyzed olefin-maleic anhydride solution has the added advantages of being non-toxic, non-irritating and odorless.

The invention is illustrated in the following examples which, however, are not to be construed as limiting it in any manner except as it is limited in the appended claims. All parts given are by weight.

*Example I*

Three parts of a copolymer of ethylene and maleic anhydride having a specific viscosity of 0.6 was added to seven parts of water, stirred, and heated to boiling. The mixture was maintained under reflux conditions overnight. The resulting solution, highly viscous and clear, was spread by brushing upon the upper surface of a number of sealed polyethylene bags having walls of 10-mil thickness and filled with polyethylene pellets. Approximately one square foot of the surface area in the center of the bag was covered with the copolymer solution. The bags were then stacked one upon the other. After a lapsed time of approximately ten minutes, the bags were bonded together so that they could not be separated by a force exerted in a direction parallel to the bags. However, upon the application of a force in a direction perpendicular to the bags, they were readily separable. In other words, the bags could not be slipped away from each other but they could be lifted from each other without any damage to the film surface.

*Example II*

Samples of a copolymer of propylene-maleic anhydride having a specific viscosity of 0.5 and of a copolymer of ethylene and maleic anhydride having a specific viscosity of 0.1 were added respectively to water in the proportions of 3 parts of the copolymer to 7 parts of water and the resulting mixtures were heated separately under reflux conditions until the copolymers had dissolved. These materials were then brushed onto the top surface of each of the bags in two separate sets of polyethylene bags having walls of 1.5-mil thickness. The bags were then superimposed one upon the other, pressed together, and allowed to set for approximately one hour. The bags in both sets were bonded to each other so that they could not be slipped one from the other but they could be readily pulled apart without ripping or tearing of the bag walls.

Example III

An aqueous solution of the hydrolyzed ethylene-maleic anhydride copolymer as prepared in Example I having a concentration of 30% by weight of the copolymer was used to treat 800 polyethylene bags each packed with approximately 50 lbs. of solid pelletized polyethylene. The bags were conveyed over rollers which were immersed in the copolymer solution and an area of approximately one square foot in the center of the bag surface was wetted with the solution. The bags were then stacked on pallets one upon the other and carried to a storage area. From this storage area, they were later loaded on railroad freight cars and sent on consignment to a distant point requiring a trip of about a week's duration. At the point of receipt, they were unloaded from the freight cars and again stored in a warehouse. No hold-up in the loading and unloading operations was experienced as a result of slipping of the bags off of one another and yet at the end of this time, the bags were readily separable by merely lifting them up off the stacks or piles, with no damage whatsoever resulting to the bags.

What is claimed is:

1. The method of preventing slipping between polyethylene film surfaces which comprises applying to one of said film surfaces a coating of a viscous aqueous solution of a hydrolyzed copolymer of an olefin containing from 1 to 8 carbon atoms and maleic anhydride, wherein the concentration of said copolymer is in the range from about 15 to about 40% by weight, and bringing the coated surface into contact with another of said polyethylene film surfaces.

2. The method of preventing slipping between polyethylene film surfaces which comprises applying to one of said film surfaces a coating of a viscous aqueous solution of a hydrolyzed copolymer of an olefin containing from 1 to 8 carbon atoms and maleic anhydride having a specific viscosity in the range from about 0.1 to about 1.0 as determined at 25° C. on a 1% by weight solution of the anhydride form of the copolymer in dimethylformamide, wherein the concentration of said copolymer is in the range from about 15 to about 40% by weight, and bringing the coated surface into contact with another of the said polyethylene film surfaces.

3. The method of preventing slipping between polyethylene film surfaces which comprises applying to one of said film surfaces a coating of a viscous aqueous solution of a hydrolyzed copolymer of ethylene and maleic anhydride, wherein the concentration of said copolymer is in the range from about 15 to about 40% by weight, and bringing the coated surface into contact with another of said polyethylene film surfaces.

4. The method of claim 3 wherein said hydrolyzed copolymer of ethylene and maleic anhydride has a specific viscosity in the range from about 0.1 to 1.0 as determined at 25° C. on a 1% by weight solution of the anhydride form of the copolymer in dimethylformamide.

5. The method of claim 4 wherein the concentration of the hydrolyzed copolymer of ethylene and maleic anhydride in the aqueous solution is about 30% by weight.

6. The method of preventing slipping between polyethylene film surfaces which comprises applying to one of said film surfaces a coating of a viscous aqueous solution of a hydrolyzed copolymer of propylene and maleic anhydride, wherein the concentration of said copolymer is in the range from about 15 to about 40% by weight, and bringing the coated surface into contact with another of said polyethylene film surfaces.

7. The method of claim 6 wherein said hydrolyzed copolymer of propylene and maleic anhydride has a specific viscosity in the range from about 0.1 to 1.0 as determined at 25° C. on a 1% by weight solution of the anhydride form of the copolymer in dimethylformamide.

8. The method of claim 7 wherein the concentration of the hydrolyzed copolymer of propylene and maleic anhydride in the aqueous solution is about 30% by weight.

References Cited in the file of this patent

UNITED STATES PATENTS

| Number | Name | Date |
|---|---|---|
| 2,378,629 | Hanford | June 19, 1945 |
| 2,396,785 | Hanford | Mar. 19, 1946 |
| 2,467,234 | Sargent et al. | Apr. 12, 1949 |
| 2,490,536 | Murphy et al. | Dec. 6, 1949 |
| 2,589,069 | Fasce | Mar. 11, 1952 |
| 2,653,113 | Banigan | Sept. 22, 1953 |
| 2,866,771 | Sellers | Dec. 30, 1958 |
| 2,892,736 | Johnson et al. | June 30, 1959 |